United States Patent [19]

Yamauchi et al.

[11] Patent Number: 4,612,495
[45] Date of Patent: Sep. 16, 1986

[54] GENERATOR CIRCUITRY

[75] Inventors: Takao Yamauchi; Hayato Suzuki; Osamu Iwabuchi; Toshinobu Kishimoto, all of Hyogo, Japan

[73] Assignee: Mitsubishi Denki Kabushiki Kaisha, Tokyo, Japan

[21] Appl. No.: 585,604

[22] Filed: Mar. 2, 1984

[30] Foreign Application Priority Data

Mar. 4, 1983 [JP] Japan .............................. 58-31756[U]
Mar. 4, 1983 [JP] Japan .............................. 58-31757[U]
Mar. 4, 1983 [JP] Japan .............................. 58-31758[U]

[51] Int. Cl.[4] .......................... H02J 1/00; H02J 3/00; H03H 1/00; H03H 3/00
[52] U.S. Cl. ..................................... 322/100; 307/85; 307/126; 361/3
[58] Field of Search ........................ 307/2-4, 307/8, 112, 113, 125, 126, 84-87; 361/1-3, 5, 14, 20, 21; 322/100

[56] References Cited

U.S. PATENT DOCUMENTS 3,069,556 12/1962 Apfelbeck et al. ............. 322/100 X
3,223,888 12/1965 Koppelmann ...................... 361/3 X
3,697,773 10/1972 Reitan et al. ...................... 307/85 X

FOREIGN PATENT DOCUMENTS 219163 3/1982 Austria ................................. 307/87
2451011 4/1976 Fed. Rep. of Germany .......... 361/5
40376 3/1907 Switzerland ............................ 361/2

OTHER PUBLICATIONS

Interrupting Performance of Capacitive Current by Disconnecting Switch for Gas Insulated Switchgear, S. Narimatsu et al., IEEE (81 WM 144-5).
Disconnect Switch Induced Transients and Trapped Charge in Gas-Insulated Substations, S. A. Boggs et al., IEEE (82 WM 003-2).

Primary Examiner—R. J. Hickey
Attorney, Agent, or Firm—Bernard, Rothwell & Brown

[57] ABSTRACT

A generator circuitry for connecting a generator to or disconnecting the same from a bus connected to a power supply. The circuitry comprising a first disconnector, a breaker and a second disconnector connected in series with one another between the bus and the generator further includes a detecting circuit to detect the generator output and an operating circuit to prohibit an action of opening the second disconnector during detection of the generator output by the detecting circuit. Since the disconnector is opened in the state where the generator output is not detected, the disconnector is released from the duty to interrupt the charge current flowing to the interelectrode capacitance of the breaker, whereby the use of a small-sized disconnector is rendered possible.

13 Claims, 9 Drawing Figures

GENERATOR CIRCUITRY

BACKGROUND OF THE INVENTION

1. Field:

The present invention relates to a generator circuitry for connecting a generator to or disconnecting the same from a bus connected to a power supply.

2. Prior Art:

FIG. 1 schematically shows a known ordinary generator circuitry employed for connection or disconnection of a generator (3) to or from a bus (2) connected to an AC power supply (1). The circuitry comprises a first connector (4), a breaker (5), a second connector (6) and a main transformer (7) which are connected in series with one another in this order between the bus (2) and the generator (3).

FIG. 2 is an equivalent circuit diagram of the generator circuitry of FIG. 1, wherein there are shown an internal inductance (1a) of the power supply (1), an internal inductance (3a) of the generator (3), a capacitance (8) of a capacitor inserted between the ground and the joint of the first disconnector (4) and the breaker (5), a capacitance (9) of a capacitor inserted between the ground and the joint of the second disconnector (6) and the generator (3), and a capacitance (5a) of an interelectrode capacitor in the breaker (5).

In such a generator circuitry, an operation of connecting the generator (3) to or disconnecting the same from the power supply (1) is performed by closing or opening the breaker (5) in the state where the power supply (1) and the generator (3) are synchronized with each other. During this operation, the two disconnectors (4) and (6) connected to the two sides of the breaker (5) are kept closed.

When it becomes necessary to open the first disconnector (4) or the second disconnector (6) posterior to disconnection of the generator (3), each of such disconnectors needs to interrupt the charge current flowing to the capacitance of the interelectrode capacitor in the breaker (5). Particularly under such condition that there exists a great voltage phase difference between the power supply (1) and the generator (3), the interelectrode voltage applied between the two disconnectors (4) and (6) reaches a high level since the terminal voltage across the capacitance (5a) is high. Such a high interelectrode voltage renders severe the condition for interruption of the charge current while causing generation of an abnormally high voltage due to reignition. Therefore, it is requisite for each of the disconnectors (4) and (6) to have a sufficient capacity to withstand such a high voltage, hence inducing a disadvantage that the generator circuitry becomes dimensionally large.

SUMMARY OF THE INVENTION

It is an object of the present invention to provide an improved generator circuitry which permits use of small-capacity disconnectors and thereby achieves dimensional reduction in the entire structure.

In an aspect of this invention, the novel generator circuitry has, between a breaker and a generator, a detecting circuit to detect the generator output and an operating circuit to prohibit opening of a disconnector during detection of the generator output by the detecting circuit.

In another aspect, the generator circuitry of this invention has a first impedance element inserted between the ground and the joint of a first disconnector and a breaker, and a second impedance element inserted between the ground and the joint of the breaker and a second disconnector. By the action of voltage division, such impedance elements serve to suppress the interelectrode voltage of the disconnector proximate to the generator even when a large phase difference is existent between the power supply and the generator, thereby diminishing the required interruption capacity of the disconnector.

In a further aspect, the generator circuitry of this invention comprises a first bus connected to a power supply, a first breaker inserted between the first bus and a second bus, a series circuit of a first disconnector, a second breaker and a second disconnector connected mutually in this order between the second bus and the generator, and a third disconnector inserted between the first bus and the joint of the first disconnector and the second breaker. Each of the operating circuits for the first and third disconnectors is so formed as to be permitted to perform its opening action only under the condition that both the second breaker and the second disconnector are open. Thus, it becomes possible to lessen the capacities of the first and third disconnectors, hence realizing dimensional reduction in the generator circuitry as a whole.

DESCRIPTION OF THE PREFERRED EMBODIMENTS

Figure 1:
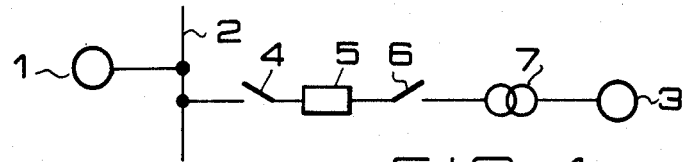
FIG. 1 is a schematic circuit diagram of a conventional generator circuitry.
Figure 3:
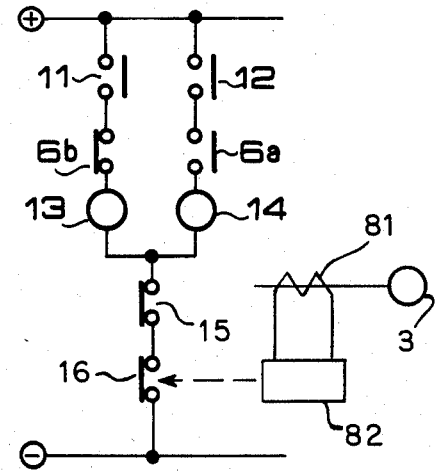
FIG. 3 is a schematic circuit diagram of an operating circuit employed in the generator circuitry of this invention to actuate a disconnector on the generator side.

FIG. 3 shows the construction of an operating circuit employed in an exemplary generator circuitry of FIG. 1 according to this invention so as to actuate a disconnector on the generator side. This operating circuit has a first series path consisting of an operating switch (11), an auxiliary contact (6b) and a closing coil (13); a second series path consisting of an operating switch (12), an auxiliary contact (6a) and an opening coil (14); and a third series path consisting of two contacts (15, 16). The first and second series paths are connected in parallel with each other to constitute a parallel arrangement, which is connected at one end thereof to a plus line of a control power supply while being connected at the other end thereof to a minus line of the control power supply via the third series path.

The operating switches (11, 12) are so disposed as to be turned on correlatively with each other when closing or opening the disconnector (6). The auxiliary contacts (6a, 6b) are turned on or off reversely to each other in accordance with the closed or open state of the disconnector (6). In this example, the configuration is formed in such a manner that one contact (6a) is turned off while the other contact (6b) is turned on when the disconnector (6) is in its open state. The closing coil (13) has a function to close the disconnector (6) when energized with a current fed from the control power supply, and the opening coil (14) has a function to open the disconnector (6). Accordingly, if the operating switches (11) and (12) are turned on under the condition that aftermentioned contacts (15) and (16) are both at on-positions, an actuating current is fed to either the closing coil (13) or the opening coil (14) in accordance with the states of the auxiliary contacts (6a) and (6b), whereby the disconnector (6) is closed or opened.

Figure 9:
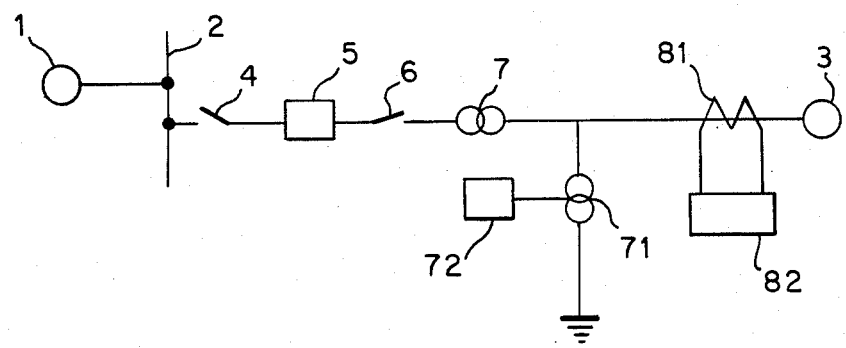
FIG. 9 is a schematic circuit diagram of an operating circuit employed in the generator circuitry of this invention to actuate a disconnector, illustrating components for detecting generator voltage or current.

The contact (15) in the third series path is an auxiliary one for a generator-circuitry grounding device (not shown) and is turned on when this device is in the state of forming a grounding circuit. The other contact (16) is driven by the output signal of a detecting circuit (not shown) obtained from the output of the generator (3) and is kept at its off-position only during detection of the generator output. The contact (16) may be an auxiliary contact of a switching device for a generator exciter, or a contact of a voltage relay driven by the output of a transformer in the generator circuitry, or a contact of a current relay which detects the current flowing to the generator. A current transformer 81 is provided for detecting an output current of the generator 3, and the output of the current transformer is fed to a current relay 82 which operates the contact 16 to control the disconnector 6. An illustration of a voltage transformer for driving a voltage relay to actuate the contact 16 is shown in FIG. 9. As there illustrated, a voltage transformer 71 is connected to the line between the generator and the main transformer 7 for detecting the output voltage of the generator. The detected voltage is supplied to a voltage relay 72 for opening the contact 16 when the detected voltage reaches a predetermined value. The contact (15) is not a requisite in the present invention.

The operating circuit shown in FIG. 3 is used for the second disconnector (6), and a similar operating circuit is also provided for the first disconnector (4).

Figure 2:
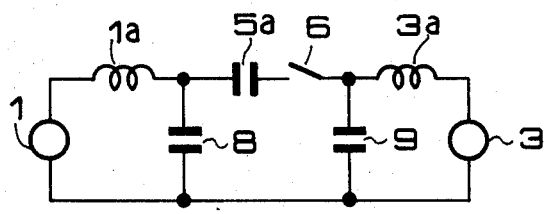
FIG. 2 is an equivalent circuit diagram of the generator circuitry shown in FIG. 1.

When the operating switches (11, 12) are closed, an actuating current is fed to either the closing coil (13) or the opening coil (14) only under limited condition that at least the contact (16) is kept at its on-position. In other words, an action of opening the first disconnector (4) or the second disconnector (6) is prohibited as long as the output of the generator (3) is being detected. In the absence of the generator output, no great amount of electric charge is not stored in the capacitance (5a) in the equivalent circuit of FIG. 2, so that no abnormal voltage is generated and consequently no impediment is induced in opening or closing the disconnector (4) or (6).

Figure 4:
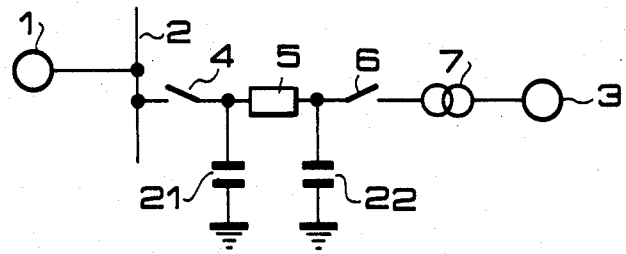
FIG. 4 is a schematic circuit diagram of another embodiment of the invention.

Another generator circuitry of FIG. 4 embodying this invention has a first capacitor (21) inserted between the ground and the joint of a first disconnector (4) and a breaker (5), and a second capacitor (22) inserted between the ground and the joint of a second disconnector (6) and the breaker (5). Since other components are the same as those shown previously in Fig. 1, the corresponding ones are represented by like reference numerals and a repeated explanation is omitted here. Each of the capacitances of the first and second capacitors (21, 22) is so selected as to be approximate to or greater than the interelectrode capacitance (5a) in the breaker (5).

Figure 5:
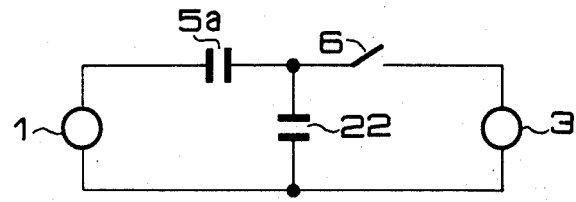
FIG. 5 is an equivalent circuit diagram showing the state where a disconnector on the power supply side is closed in the generator circuitry of FIG. 4.

FIG. 5 shows an equivalent circuit in the state where the breaker (5) and the first disconnector (4) are closed while the second disconnector (6) is open. Since the capacitance of the capacitor (22) is equal to or greater than the interelectrode capacitance (5a) in the breaker (5) as mentioned previously, an action of voltage division is exerted so that, even when the generator (3) is not exactly synchronized with the power supply, the voltage applied across the second disconnector (6) becomes far lower than that in the absence of the capacitor (22), thereby reducing the interruption duty of the second disconnector.

Similar effect is achievable due to the voltage division of the capacitor (21) also in the state where the second disconnector (6) is closed while the first disconnector (4) is open. Therefore, each of the two disconnectors (4, 6) may be an ordinary one having a normal interruption capacity.

The capacitors (21, 22) may be condenser type bushings or gas-insulated condensers. In place of such capacitors, it is possible to employ other impedance elements such as zinc oxide type arresters adapted for suppression of abnormal voltage.

The present invention is further applicable to a generator circuitry of FIG. 6, which is different from the foregoing embodiment of FIG. 1 in the following point. That is, a second bus (32) is connected to the aforesaid bus (2) via a second breaker (31), and a third disconnector (33) is inserted between the second bus (12) and the first breaker (5).

Figure 7:
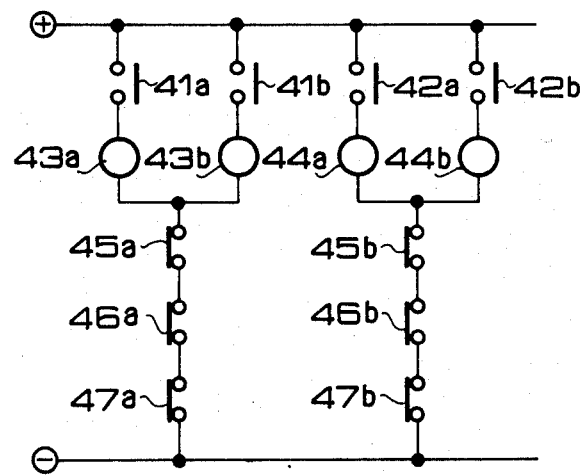
FIG. 7 is a schematic circuit diagram of an operating circuit employed in the generator circuitry of FIG. 6 to actuate two disconnectors.

FIG. 7 shows an operating circuit designed to open or close the first disconnector (4) and the third disconnector (33), wherein there are provided operating switches (41a, 41b, 42a, 42b) and operating coils (43a, 43b, 44a, 44b). The switch (41a) is connected in series with the coil (43a), and similarly the switch (41b) is connected in series with the coil (43b), thereby forming two series paths. Each of such series paths is connected at its one end to a plus side of a control power supply while being connected at its other end to a minus side of the control power supply via three contacts (45a, 46a, 47a) which are connected in series with one another. In the same manner, a series path consisting of the switch (42a) and the coil (44a) is connected in parallel with another series path consisting of the switch (42b) and the coil (44b) to constitute a parallel arrangement, which is further connected at its one end to the plus side of the control power supply while being connected at its other end to the minus side thereof via three contacts (45b, 46b, 47b).

When the operating switch, (41a) is turned on with the entire contacts (45a, 46a, 47a on-positions respectively, a predetermined driving current is fed from the control power supply to the operating coil (43a), thereby closing the first disconnector (4). Subsequently, when the operating switch (41b) is turned on after turning off the operating switch (41a), the coil (43b) is energized to open the first disconnector (4). Energization of the operating coil (43a) or (43b) is not executed in case any one of the three contacts (45a, 46a, 47a) is placed at the off-position thereof.

The operating coils (44a) and (44b) perform the action of opening or closing the third disconnector (33) under control of the operating switches (42a) and (42b) respectively. The contacts (45b, 46b, 47b) serve to set predetermined conditions with respect to the individual actions of the operating coils (44a, 44b).

The contacts (45a, 45b) are closed when the first breaker (5) is opened; the contacts (46a, 46b) are closed when the second disconnector (6) is opened; and the contacts (47a, 47b) are auxiliary ones for a generator-circuitry grounding device (not shown).

Accordingly, energization of the entire operating coils (43a, 43b, 44a, 44b) to close or open the first and third disconnectors (4, 33) is permitted merely under the condition that both the first breaker (5) and the second disconnector (6) are in the open state thereof and no abnormality is existent in the generator circuitry. Under such condition, the first and third disconnectors (4, 33) are kept free from being affected, at the time of closing, by the charge current flowing to the interelectrode capacitor of the first breaker (5), whereby it is allowed to employ compact disconnectors (4, 33) of small capacities. And the requirement is satisfied merely if the second disconnector (6) alone has a sufficient capacity to interrupt the charge current flowing to the interelectrode capacitor of the first breaker (5).

Figure 6:
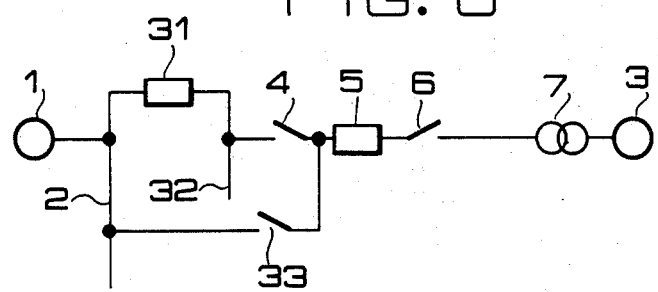
FIG. 6 is a schematic circuit diagram of a further embodiment of the invention.
Figure 8:
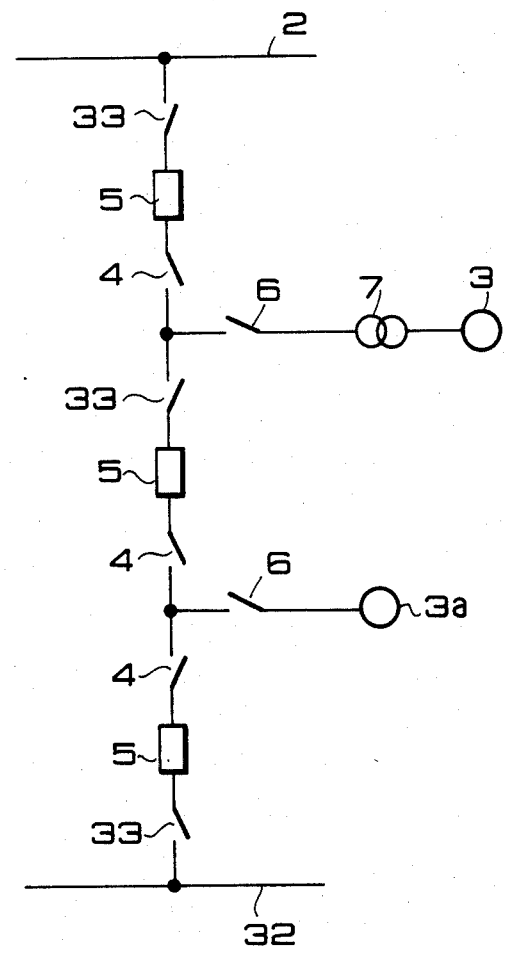
FIG. 8 is a schematic circuit diagram of an even further embodiment of the invention.

FIG. 8 shows another exemplary embodiment of the invention applied to a generator circuitry of a composite interruption system, wherein the same components as those used in the foregoing circuitry of FIG. 6 are represented by like reference numerals and a repeated explanation is omitted. In FIG. 8, a reference numeral (3a) denotes a second generator. Satisfactory effect similar to that achieved in the foregoing example of FIG. 6 is attainable by using the operating circuit of FIG. 7 for the first and third disconnectors (4, 33).

As described hereinabove, according to the present invention which is capable of reducing the interruption duty of at least one of disconnectors, it becomes possible to employ small-sized disconnectors to eventually realize a compact and lightweight generator circuitry.

We claim:

1. In a generator circuitry having a first disconnector, a breaker and a second disconnector connected in series with one another between a generator and a bus connected to a power supply, the improvement comprising: an operating circuit for opening or closing said first and second disconnectors; means for detecting the output of said generator; and means for prohibiting an action of opening said first and second disconnectors during detection of the generator output by said detecting means.

2. The generator circuitry as defined in claim 1, wherein said operating circuit has an operating coil to open or close said first and second disconnectors, and a control power supply to feed a predetermined actuating current to said operating coil; and said prohibit means is a contact inserted between said operating coil and said control power supply and driven by said detecting means.

3. The generator circuitry as defined in claim 2, wherein said detecting means is a switching device for a generator exciter, and said contact is an auxiliary contact of said switching device.

4. The generator circuitry as defined in claim 2, wherein said detecting means includes a voltage transformer connected to the generator for detecting the voltage of the generator and is a voltage relay driven by the output of a voltage transformer, and said contact is a contact of said voltage relay.

5. The generator circuitry as defined in claim 2, wherein said detecting means is a current relay provided for detection of an electric current flowing to said generator, and said contact is a contact of said current relay.

6. In a generator circuitry having a first disconnector, a breaker and a second disconnector connected in series with one another between a generator and a bus connected to a power supply, the improvement including an impedance element inserted between the ground and the joint of said breaker and said second disconnector.

7. The generator circuitry as defined in claim 6, further including another impedance element inserted between the ground and the joint of said first disconnector and said breaker.

8. The generator circuitry as defined in claim 6 or 7, wherein said impedance element is a capacitor.

9. The generator circuitry as defined in claim 8, wherein the capacitance of said capacitor is equal to or greater than the interelectrode capacitance of said breaker.

10. The generator circuitry as defined in claim 8, wherein said capacitor is a gas-insulated capacitor.

11. The generator circuitry as defined in claim 7, wherein said impedance element is a zinc oxide type arrester.

12. A generator circuitry comprising a first bus connected to a power supply; a second bus different from said first bus; a first disconnector, a first breaker and a second disconnector connected in series with one another between said second bus and said generator; a second breaker inserted between said first and second buses; and a third disconnector inserted between said first bus and the joint of said first disconnector and said first breaker: wherein an operating circuit is further included to permit an action of opening said first and third disconnectors only in the open state of said second breaker and said second disconnector.

13. The generator circuitry as defined in claim 12, wherein said operating circuit comprises a first series path consisting of an opening switch turned on at a desired time to open said first disconnector, and an opening coil energized to open said first disconnector; a second series path consisting of a closing switch turned on at a desired time to close said first disconnector, and a closing coil energized to close said first disconnector; a third series path consisting of a first contact closed when said first breaker is in an open state, and a second contact closed when said second disconnector is in an open state, said first and second series paths being connected in parallel with each other to constitute a first parallel arrangement which is connected at one end thereof to one terminal of a control power supply while being connected at the other end thereof to the other terminal of said control power supply via said third series path; a fourth series path consisting of an opening switch turned on at a desired time to open said third disconnector, and an opening coil energized to open said third disconnector; a fifth series path consisting of a closing switch turned on at a desired time to close said third disconnector, and a closing coil energized to close said third disconnector; and a sixth series path consisting of a third contact closed when said first breaker is in a closed state, and a fourth contact closed when said second disconnector is in an open state, said fourth and fifth series paths being connected in parallel with each other to constitute a second parallel arrangement which is connected at one end thereof to one terminal of said control power supply while being connected at the other end thereof to the other terminal of said control power supply via said sixth series path.

* * * * *